United States Patent
Lee et al.

(10) Patent No.: US 11,804,723 B2
(45) Date of Patent: Oct. 31, 2023

(54) RELAY SWITCH DEVICE FOR TURNING ON/OFF HIGH CURRENT OF BATTERY PACK

(71) Applicant: LG Chem, Ltd., Seoul (KR)

(72) Inventors: Jin-Hyung Lee, Daejeon (KR); Chang-Bok Lee, Daejeon (KR)

(73) Assignee: LG Energy Solution, Ltd.

( * ) Notice: Subject to any disclaimer, the term of this patent is extended or adjusted under 35 U.S.C. 154(b) by 435 days.

(21) Appl. No.: 17/051,518

(22) PCT Filed: Nov. 7, 2019

(86) PCT No.: PCT/KR2019/015094
§ 371 (c)(1),
(2) Date: Oct. 29, 2020

(87) PCT Pub. No.: WO2020/096387
PCT Pub. Date: May 14, 2020

(65) Prior Publication Data
US 2021/0234383 A1   Jul. 29, 2021

(30) Foreign Application Priority Data
Nov. 8, 2018   (KR) .......................... 10-2018-0136942

(51) Int. Cl.
*H02J 7/00* (2006.01)
*H01M 50/249* (2021.01)

(52) U.S. Cl.
CPC ......... *H02J 7/0031* (2013.01); *H01M 50/249* (2021.01); *H02J 7/0063* (2013.01); *H01M 2220/20* (2013.01); *Y02T 10/70* (2013.01)

(58) Field of Classification Search
CPC .... H02J 7/0031; H02J 7/0063; H02J 7/00302; H02J 7/00306; H02J 2310/48;
(Continued)

(56) References Cited

U.S. PATENT DOCUMENTS 6,441,352 B1 *   8/2002   Groft ................. B29C 66/5221
219/535
2015/0316932 A1   11/2015   Kim
(Continued)

FOREIGN PATENT DOCUMENTS

| JP | 2004178967 A | 6/2004 |
| JP | 2005038656 A | 2/2005 |

(Continued)

OTHER PUBLICATIONS

International Search Report for PCT/KR2019/015094 dated Feb. 25, 2020; 3 pages.

*Primary Examiner* — Michael C Zarroli
(74) *Attorney, Agent, or Firm* — Lerner David LLP

(57) ABSTRACT

A relay switch device installed on a transmission line of a battery pack to electrically connect or disconnect the battery pack and a load includes a relay assembly including: a contact member configured to apply a current to or release a current from the transmission line and a coil unit configured to function as an electromagnet for opening and closing the contact member; a control unit configured to supply or block a relay power applied to the coil unit; and an operating voltage sensing unit configured to sense an operating voltage applied to the coil unit from the control unit. The operating voltage sensing unit is further configured to transmit an error message to the control unit when the operating voltage is lower than a preset reference operating voltage or out of a preset normal operating voltage range.

11 Claims, 5 Drawing Sheets

(58) Field of Classification Search
CPC .......... H01M 50/249; H01M 2220/20; H01M 10/448; H01M 2010/4271; H01M 10/425; H01M 10/44; H01H 50/16; H01H 50/54; H01H 50/64

See application file for complete search history.

(56) References Cited

U.S. PATENT DOCUMENTS

| | | | |
|---|---|---|---|
| 2017/0144549 A1 | 5/2017 | Park | |
| 2017/0214258 A1* | 7/2017 | Namou | H02J 7/0031 |
| 2018/0047535 A1 | 2/2018 | Sugisawa | |

FOREIGN PATENT DOCUMENTS

| | | |
|---|---|---|
| JP | 2013054920 A | 3/2013 |
| JP | 2016173904 A | 9/2016 |
| KR | 101028020 B1 | 4/2011 |
| KR | 20130111048 A | 10/2013 |
| KR | 20140081960 A | 7/2014 |
| KR | 20150125411 A | 11/2015 |
| KR | 20170000443 U | 2/2017 |
| KR | 20170000938 U | 3/2017 |
| KR | 20170059844 A | 5/2017 |
| KR | 20170099287 A | 8/2017 |

* cited by examiner

RELAY SWITCH DEVICE FOR TURNING ON/OFF HIGH CURRENT OF BATTERY PACK

CROSS-REFERENCE TO RELATED APPLICATIONS

The present application is a national phase entry under 35 U.S.C. § 371 of International Application No. PCT/KR2019/015094 filed Nov. 7, 2019, published in Korean, which claims priority from Korean Patent Application No. 10-2018-0136942 filed Nov. 8, 2018, all of which are incorporated herein by reference.

TECHNICAL FIELD

The present disclosure relates to a relay switch device, and more particularly to a relay switch device installed on a transmission line of a battery pack to electrically connect or disconnect the battery pack and a load and capable of preventing fusion of a contact point when a relay is driven.

The present application claims priority to Korean Patent Application No. 10-2018-0136942 filed on Nov. 8, 2018 in the Republic of Korea, the disclosures of which are incorporated herein by reference.

BACKGROUND ART

Vehicles driven by fossil fuels such as gasoline and diesel fuel not only pollute the air by generating a large amount of harmful exhaust gas, but also cause a lot of harm to the global environment as a major factor of global warming. In order to solve this problem, the use of fossil fuels is reduced or the development of vehicles using alternative fuels has been actively progressed. As part of this solution process, there is a growing interest in electric vehicles such as hybrid electric vehicles (HEVs) or electric vehicles (EVs) which may be driven by receiving electrical energy from a battery pack of high-efficiency.

For example, HEVs are capable of driving through an internal combustion engine that uses fossil fuels such as gasoline and diesel and simultaneously are also capable of driving through a drive motor powered by electricity supplied from a battery pack through a power conversion circuit. Based on such heterogeneous power sources, the driving of HEVs is controlled to maximize the fuel efficiency of the vehicle in response to the driving situation of the vehicle.

Meanwhile, a high voltage battery system used for a large electric load such as a hybrid vehicle supplies power to an electric driving module of the vehicle from a high voltage battery pack such that a surge high current flows from the battery pack when driving of the vehicle starts. In order to secure safety, the high voltage battery system may restrict an overcurrent flowing from the battery pack by installing a main relay 2, and a pre-charge relay and a pre-charge resistor that are not shown, on a transmission line 1 as shown in FIG. 1.

In this regard, the relay may be an electric switch as a kind of an electronic component used to divide a circuit into two circuits in an electric circuit to make a signal on one side and control the operation of the other circuit according to the signal, that is, when the circuit needs to be opened or closed.

The advantage of such a relay is to, for example, turn on/off a circuit of a high voltmeter or turn on/off a circuit of a large current by the operation of a circuit configured as a low voltmeter. This is because a coil unit and a contact member are insulated and separated such that the relay may be electrically insulated from an external device.

However, since the relay has a limited mechanical operation, the relay also has the disadvantage that there is a delay time, a spark occurs at the moment of contact with a contact point, noise is generated, or the contact point is fused due to an incomplete contact.

In particular, when the contact point of the relay is fused, the relay is inadvertently closed permanently, causing serious problems such as overdischarge, overcharge, and overcurrent of a battery.

One of the main reasons of contact point fusion of such a relay comes from sparking due to the incomplete contact of the contact point when a voltage lower than the normal operating voltage is applied to the coil of the relay.

SUMMARY

Technical Problem

The present disclosure is designed to solve the problems of the related art, and therefore the present disclosure is directed to providing a relay switch device capable of preventing the risk of contact point fusion of a relay due to the drop of a relay operating voltage.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a relay switch device installed on a transmission line of a battery pack to electrically connect or disconnect the battery pack and a load including a relay assembly comprising a contact member configured to apply an electrical current to or release the electrical current from the transmission line and a coil unit configured to function as an electromagnet for opening and closing the contact member; a control unit configured to supply or block a relay power applied to the coil unit; and an operating voltage sensing unit configured to sense an operating voltage applied to the coil unit from the control unit, wherein the operating voltage sensing unit may transmit an error message to the control unit when the operating voltage is lower than a preset reference operating voltage or out of a preset normal operating voltage range.

The control unit may block the relay power after receiving the error message.

The relay switch device may further include a DC/DC converter configured to raise the operating voltage to within the normal operating voltage range when the out of the preset normal operating voltage range or to above the reference operating voltage when the operating voltage is lower than the reference operating voltage.

The control unit may operate the DC/DC converter after receiving the error message.

The operating voltage sensing unit may transmit a low voltage error message to the control unit when the operating voltage is lower than the normal operating voltage range, and transmit a high voltage error message to the control unit when the operating voltage is higher than the normal operating voltage range, and the control unit may control the DC/DC converter to raise the operating voltage to within the normal operating voltage range after receiving the low voltage error message and reduce the operating voltage to within the normal operating voltage range after receiving the high voltage error message.

The control unit may function as a battery management system (BMS) that controls overcharge or overdischarge of the battery pack.

The relay assembly may be a hinge-type electromagnetic relay assembly or a plunger-type electromagnetic relay assembly.

The contact member may include first and second fix contact members respectively connected to first and second points which are separated from each other in the transmission line; and a moving contact member facing the first and second fix contact members and spaced apart from the first and second fix contact members by a predetermined interval, and the relay assembly may further include a plunger unit coupled to the moving contact member and provided to linearly reciprocate to cause the moving contact member to be in contact with and to be released from contact with the first and second fix contact members, the coil unit may be hollow, and the plunger unit may be disposed in a central passage inside the coil unit.

The plunger unit may include a moving core configured to move in the central passage by an electromagnetic force of the coil unit; a plunger shaft extending from the moving core and connected to the moving contact member; and a hollow fix core block through which the plunger shaft passes. The hollow fix core block may be fixedly installed in the central passage to restrict a movement of the moving core in the central passage.

The operating voltage sensing unit and the DC/DC converter may be integrally cased with the relay assembly.

Advantageous Effects

According to the present disclosure, the risk of a contact point fusion due to the incomplete contact of a contact point of a relay may be eliminated by preventing the relay from operating at a voltage lower than a preset reference operating voltage.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A switch device to be described below may be used for the purpose of turning on and off a large current supplied by a battery pack of an electric vehicle such as an HEV or an EV through an HV transmission line. The switch device according to the present disclosure is not limited to the electric vehicle, but may also be used in an electric appliance device such as an energy storage system (ESS).

Figure 1:
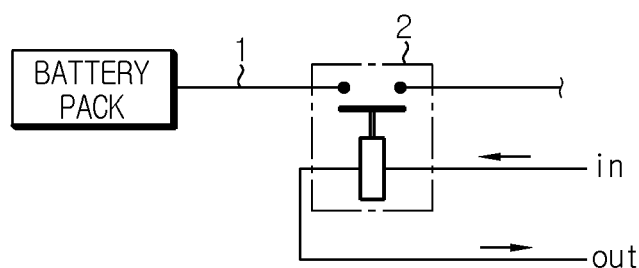
FIG. 1 is a view schematically showing a relay switch that connects a battery pack and a load of an electric vehicle according to the prior art.
Figure 2:
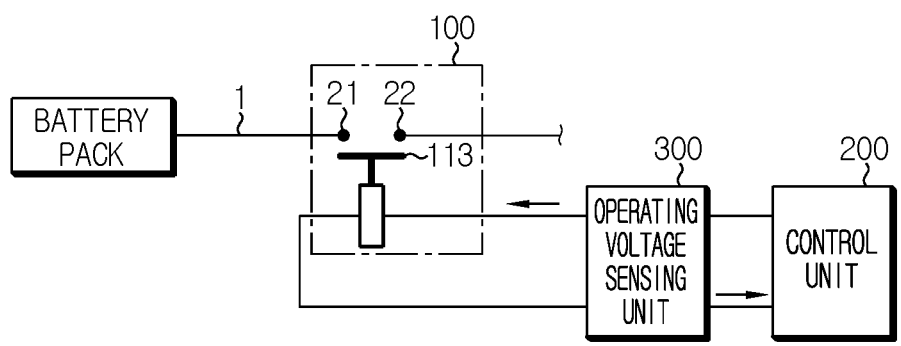
FIG. 2 is a block diagram of a relay switch device according to a first embodiment of the present disclosure.

FIG. 2 is a block diagram of a relay switch device according to a first embodiment of the present disclosure.

Referring to these drawings, a relay switch device 10 according to the first embodiment of the present disclosure includes a relay assembly 100, a control unit 200, and an operating voltage sensing unit 300.

The relay assembly 100 controls the flow of current between a battery pack and a load by connecting or disconnecting a first point 21 and a second point 22 which are separated from each other on a high voltage transmission line 1. Here, the load (not shown) refers to a device that receives power from the battery pack, such as a motor or an inverter.

The relay assembly 100 according to the present embodiment is provided in a plunger type including a contact member 110, a plunger unit 114, and a coil unit 120. However, the relay assembly 100 is an electronic switch, such as a hinge type electromagnetic relay type known in the art, and any relay assembly may be applied as long as the relay assembly operates to pull an iron piece to open or close a contact point attached to the iron piece when a coil through which a current flows becomes an electromagnet.

The relay assembly 100 may have a different rated operating voltage according to the standard of the coil unit 120. For example, when a voltage lower than the rated operating voltage is applied to the coil, sparks may occur due to the incomplete contact of the contact point, and the contact point may be fused. When a voltage higher than the rated operating voltage is applied to the coil, the coil may be melted, which may cause the relay assembly 100 to be damaged. Therefore, it is preferable to ensure that the rated operating voltage may be applied to the relay assembly 100.

Hereinafter, the rated operating voltage of the relay assembly 100 of the present embodiment is 12V, but it is considered that the relay assembly operates normally in the range of 9V to 16V and if the relay assembly is out of the range, it is considered that the relay assembly operates abnormally.

The voltage of 9V to 16V is defined as a normal operating voltage range, and the minimum voltage of 9V at the normal operating voltage is defined as a reference operating voltage.

The electric vehicle may be provided with an auxiliary battery pack of 12V voltage in addition to the battery pack, and the auxiliary battery pack of 12V voltage may be used as a power source of the relay assembly 100. Power of the auxiliary battery pack may be transferred to the relay assembly 100 via the control unit 200.

The auxiliary battery pack (not shown) may be used as a power source for various electric appliances including starting the engine or headlights of a vehicle. When the voltage drops due to discharge of the auxiliary battery pack or other causes, the voltage applied to the relay assembly 100 also drops below the rated operating voltage of 12V.

In particular, when the relay assembly 100 operates at a voltage of about 8V to 8.5V lower than the normal operating voltage range, the contact member 110 incompletely contacts and is fused by sparks and heat generated at this time, which may cause serious problems with the vehicle.

Accordingly, in the present disclosure, when the voltage falls below the reference operating voltage, an operating voltage sensing unit 300 senses this voltage fall and transmits an error message to the control unit 200 to block the supply of relay power to the relay assembly, thereby preventing contact point fusion.

The control unit 200 is a battery management system (BMS) that controls the charging and discharging of the battery pack and controls the relay power applied to the relay assembly 100 when receiving the error message from operating voltage sensing unit 300.

The control unit 200 may optionally include a processor, an application-specific integrated circuit (ASIC), another chipset, a logic circuit, a register, a communication modem, a data processing device, and the like, which are known in the art.

The operating voltage sensing unit 300 is connected to both ends of the coil unit 120 of the relay assembly 100 to sense an initial operating voltage applied to the coil and compare the initial operating voltage with a reference operating voltage.

In this regard, when the initial operating voltage is lower than the reference operating voltage, an error message is transmitted from the operating voltage sensing unit 300 to the control unit 200.

A communication interface between the operating voltage sensing unit 300 and the control unit 200 may preferably be a CAN communication interface or a daisy chain communication interface. The present disclosure is not limited by the type of the communication interface.

The control unit 200 receiving the error message from the operating voltage sensing unit 300 blocks the power supply to the relay assembly 100. Accordingly, the relay assembly 100 does not operate below the reference operating voltage, which may prevent incomplete contact of the relay contact member 110, thereby eliminating the risk of contact point fusion.

Unlike the foregoing description, the operating voltage sensing unit 300 may be configured to transmit an error message to the control unit 200 when sensing a voltage beyond the preset normal operating voltage range 9V to 16V.

That is, not only when a voltage lower than 9V is applied as the operating voltage but also when a voltage higher than 16V is applied as the operating voltage, the operating voltage sensing unit 300 may transmit the error message to the control unit 200 to block the power supply to the relay assembly 100. In this case, damage to the relay assembly 100 due to overvoltage may be prevented.

Figure 3:
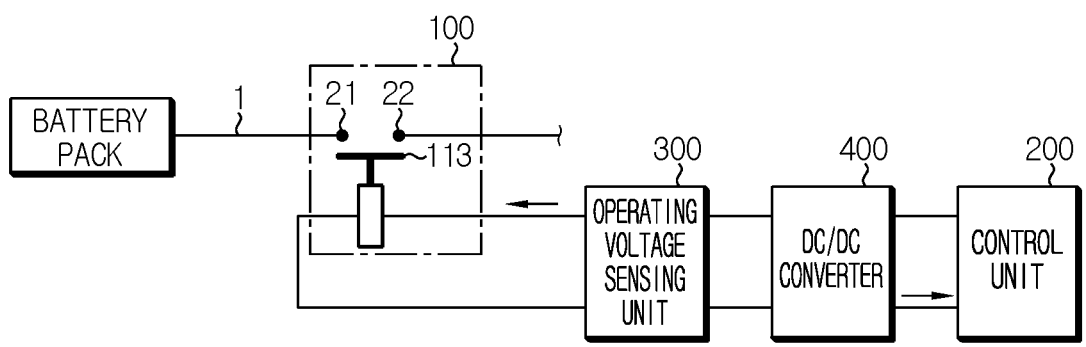
FIG. 3 is a block diagram of a relay switch device according to a second embodiment of the present disclosure.

FIG. 3 is a block diagram of the relay switch device 10 according to a second embodiment of the present disclosure. Subsequently, the relay switch device 10 according to the second embodiment of the present disclosure will be described with reference to FIG. 3.

The relay switch device 10 according to the second embodiment may further include a DC/DC converter 400 as compared to the first embodiment. In the first embodiment, an initial operating voltage applied to the coil unit 120 from the control unit 200 and a reference operating voltage are compared, and when an operating voltage is lower than the reference operating voltage (9V), the power supply to the relay assembly 100 is merely blocked, whereas, in the second embodiment, when the operating voltage is lower than the reference operating voltage (9V), the DC/DC converter 400 is used to raise a previous operating voltage to a normal operating voltage range (9V to 16V) such that the relay assembly 100 operates normally.

Here, the DC/DC converter 400 may selectively operate according to the control logic of the control unit 200. For example, the DC/DC converter 400 may be configured to operate when the control unit 200 receives an error message from the operating voltage sensing unit 300.

Figure 4:
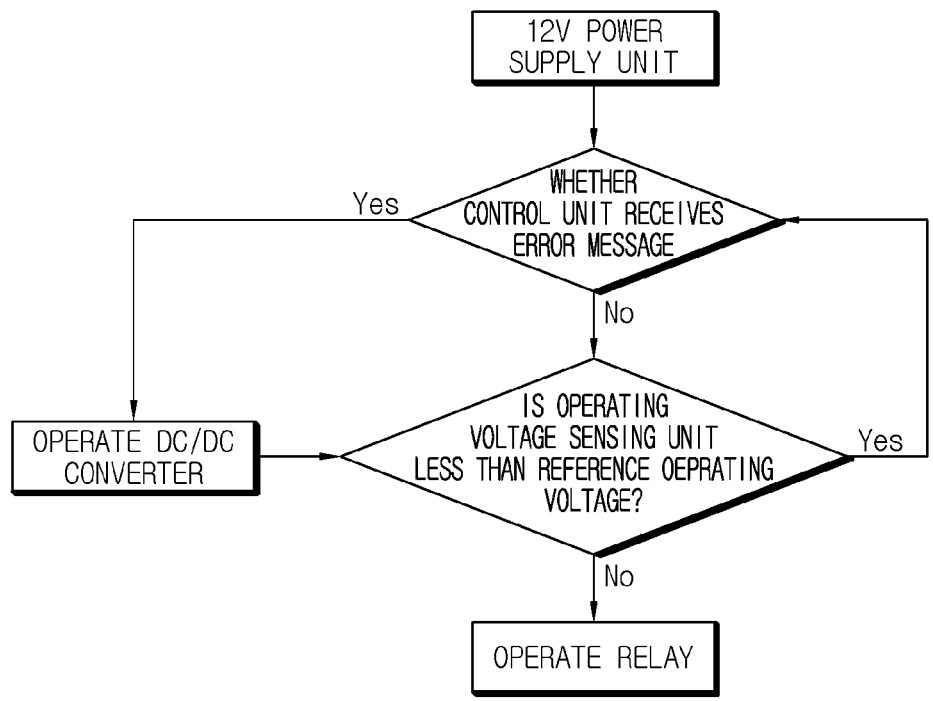
FIG. 4 is a flowchart illustrating a flow of a control method of the relay switch device according to the second embodiment of the present disclosure.

Referring to FIG. 4, in more detail, power of an auxiliary battery pack of 12V voltage included in an electric vehicle is supplied to the relay assembly 100 or blocked via the control unit 200. The power is supplied to the relay assembly 100 or blocked by the control unit 200 such that the relay assembly 100 may be turned on or off.

The operating voltage sensing unit 300 senses the voltage of the coil unit 120 and compares the operating voltage supplied from the control unit 200 to the relay assembly 100 with the reference operating voltage. In this regard, when the initial operating voltage is higher than the reference operating voltage, because an error message is not transmitted to the control unit 200, the DC/DC converter 400 may not operate and the relay assembly 100 may operate at the initial operating voltage.

However, when the initial operating voltage is lower than the reference operating voltage, an error message may be transmitted to the control unit 200 such that the DC/DC converter 400 may operate by the control unit 200. In this regard, the DC/DC converter 400 raises the initial operating voltage to the normal operating voltage range (9V to 16V) equal to or greater than the reference operating voltage.

Therefore, the relay assembly 100 may always operate at a voltage higher than the reference operating voltage, and thus the risk of contact point fusion of a relay due to a low voltage may be significantly lowered.

Meanwhile, the foregoing description has been described in consideration of the case where the initial operating voltage is lower than the reference operating voltage, but the operating voltage may be adjusted by the relay switch device 10 of the present disclosure even when the initial operating voltage is excessively higher than the reference operating voltage.

For example, as described above, the operating voltage sensing unit 300 may be configured to transmit an error message to the control unit 200 when sensing a voltage beyond the preset normal operating voltage range of 9V to 16V. In this regard, when the sensed voltage is less than 9V, the operating voltage sensing unit 300 transmits a low voltage error message. On the contrary, when the sensed voltage exceeds 16V, the operating voltage sensing unit 300 transmits a high voltage error message. That is, the operating voltage sensing unit 300 may be configured to transmit two types of error messages to the control unit 200.

The control unit 200 operates the DC/DC converter 400 to raise or reduce the initial operating voltage according to the two types of error messages as described above. That is, if the initial operating voltage is less than 9V, the control unit 200 raises the initial operating voltage and if the initial operating voltage exceeds 16V, the control unit 200 reduces the initial operating voltage such that the relay assembly 100 may always operate within the normal operating voltage range. Here, as the DC/DC converter 400, a dual DC/DC converter 400 that raises and reduces voltages may be employed.

Next, a plunger type relay assembly 100 according to an embodiment of the present disclosure will be described with reference to FIGS. 5 and 6.

The relay assembly 100 according to the present embodiment may include the contact member 110, a plunger unit 114, the coil unit 120, and a relay housing 130 accommodating them.

In addition, the operating voltage sensing unit 300 and the DC/DC converter 400 described above may be configured on a printed circuit board and cased inside the relay housing 130. That is, the operating voltage sensing unit 300 and the DC/DC converter 400 may be embedded in the relay assembly 100.

The contact member 110 includes a first fix contact member 111, a second fix contact member 112, and a moving contact member 113. The first fix contact member 111 and the second fix contact member 112 are respectively connected to the first point 21 and the second point 22 which are separated from each other on the transmission line, and the moving contact member 113 faces and is spaced apart from the first and second fix contact members 111 and 112 by a predetermined interval.

The moving contact member 113 is provided in a metal plate shape and is in contact with or is released from the contact with the first fix contact member 111 and the second fix contact member 112, and thus flow of a large current on the transmission line may be controlled.

Contact and release from the contact between the moving contact member 113 and the first and second fix contact members 111 and 112 follow the linear reciprocating motion of the plunger unit 114.

The coil unit 120 causes the plunger unit 114 to linearly reciprocate by a solenoid action. The coil unit 120 is formed to have a cylindrical shape, i.e., a hollow shape, by winding the coil, and the plunger unit 114 is disposed in a central passage provided inside the coil unit 120.

The plunger unit 114 may move out of the central passage of the coil unit 120 by the solenoid action of the coil unit 120 when a current flows in the coil unit 120. At this time, the moving contact member 113 and the first and second fix contact members 111 and 112 are in contact with each other. In addition, when the current is blocked in the coil unit 120, the plunger unit 114 may be returned to its original position such that the moving contact member 113 and the first and second fix contact members 111 and 112 may be released from the contact with each other.

The plunger unit 114 may include a moving core 115, a plunger shaft 116 and a fix core 117.

The moving core 115 is provided as a metal block to move by an electromagnetic force of the coil unit 120 without being restrained in the central passage. The plunger shaft 116 may extend in the longitudinal direction of the central passage in the moving core 115 and the end thereof is engaged with the moving contact member 113 outside the central passage. The moving core 115 and the plunger shaft 116 move integrally when a current is applied to the coil unit 120.

The fix core 117 serves to limit the moving distance of the moving core 115 and the plunger shaft 116. The fix core 117 is fixed in the central passage of the coil unit 120, has a hollow shape and has an inner diameter by which the plunger shaft 116 may pass through but the moving core 115 may not pass through.

Figure 5:
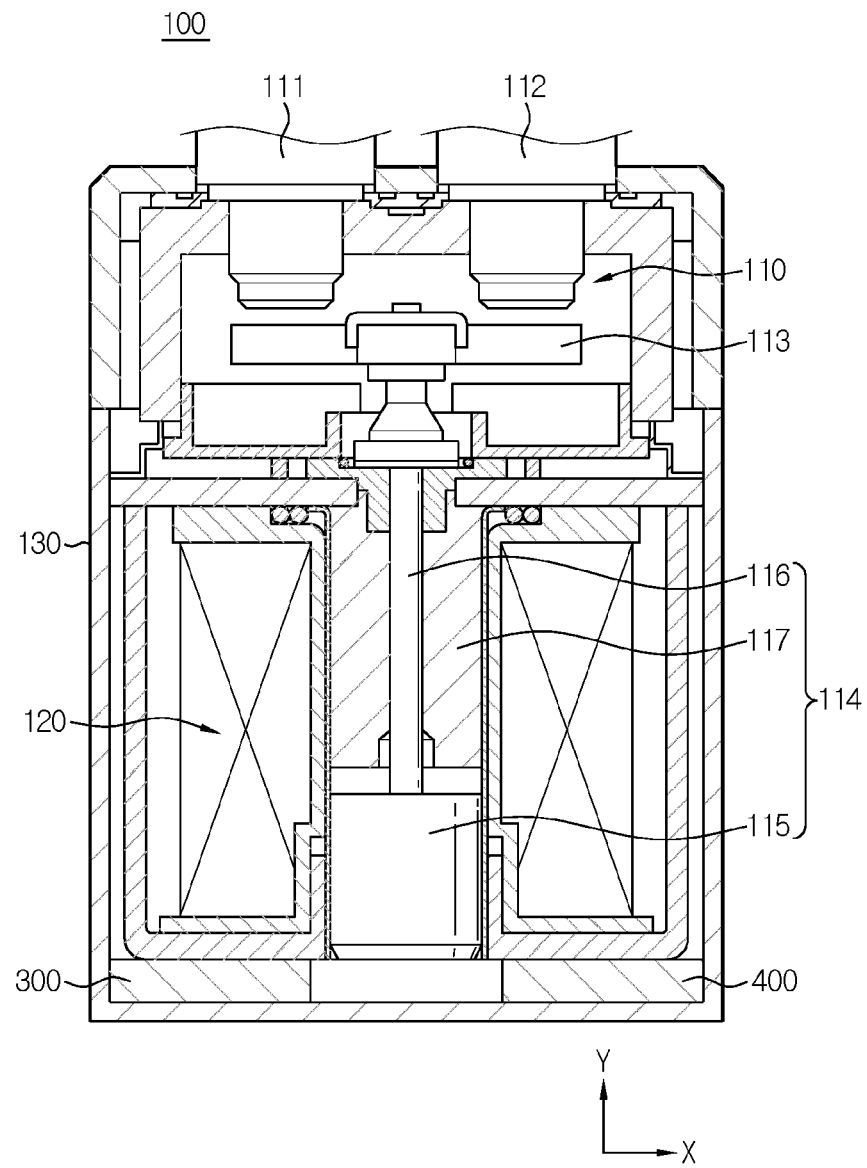
FIGS. 5 and 6 are diagrams schematically showing a relay assembly before and after an operation thereof.
Figure 6:
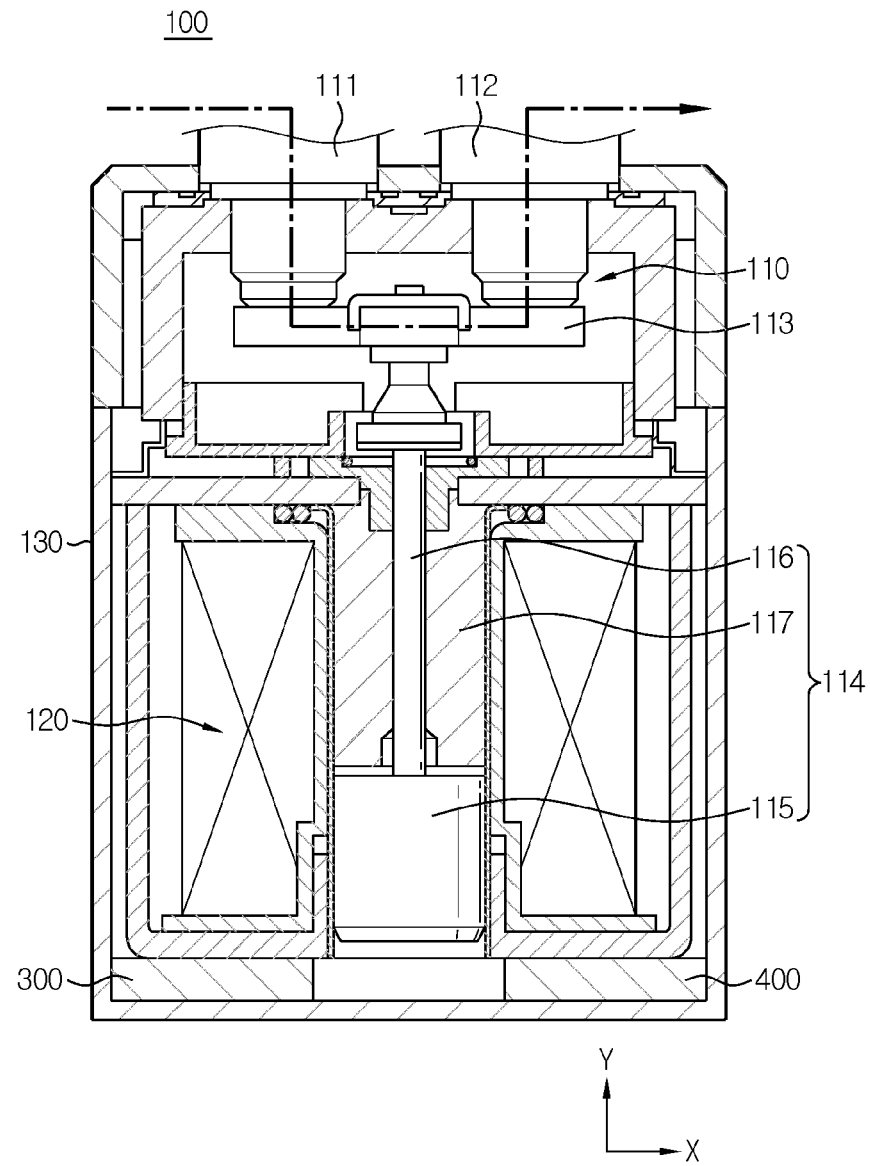

With this configuration, referring to FIGS. 5 and 6, when the current is applied to the coil unit 120, the moving core 115 may move by the electromagnetic force of the coil unit 120 to a position in contact with the fix core 117 in the +Y-axial direction. At this time, the moving distance of the moving core 115 corresponds to the distance between the moving contact member 113 and the first and second fix contact members 111 and 112.

As described above, when the voltage between both ends of the coil unit 120, that is, the operating voltage of the relay assembly 100 is less than 9V, the moving contact member 113 and the first and second fix contact members 111 and 112 may be likely to be in incomplete contact. However, according to the present disclosure, when an operating voltage below the reference operating voltage is sensed, the power supply is blocked or a voltage rose to the normal operating voltage is applied such that there is little risk of fusion due to the incomplete contact between the moving contact member 113 and the first and second fix contact members 111 and 112.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, in the present specification, although terms indicating directions, such as up, down, left, and right, have been used, it is obvious to those skilled in the art that these terms are merely for convenience of description and may be expressed differently according to the viewing position of an observer or the position of an object.

What is claimed is:

1. A relay switch device comprising:
a relay assembly comprising a connecting contact member configured to electrically connect first and second contact members positioned on a transmission line between a battery pack and a load, and a coil unit configured to function as an electromagnet for opening and closing an electrical connection between the first and second contact members through the connecting contact member;
a control unit configured to supply power to the coil unit; and
an operating voltage sensing unit configured to sense an operating voltage across the coil unit from the control unit,
wherein the operating voltage sensing unit is further configured to transmit an error message to the control unit in response to the operating voltage being lower than a preset reference operating voltage or out of a preset normal operating voltage range, wherein the error message is indicative of an incomplete contact of the connecting contact member to the first and second contact members, and wherein the control unit is configured to adjust the supply of the power to the coil unit in response to receipt of the error message.

2. The relay switch device of claim 1, wherein the control unit is further configured to block the supply of the power after receiving the error message.

3. The relay switch device of claim 1, further comprising a DC/DC converter configured to raise the operating voltage to within the normal operating voltage range when the out of the preset normal operating voltage range or to above the reference operating voltage when the operating voltage is lower than the reference operating voltage.

4. The relay switch device of claim 3, wherein the control unit is further configured to operate the DC/DC converter after receiving the error message.

5. The relay switch device of claim 3,
wherein the operating voltage sensing unit is further configured to transmit a low voltage error message to the control unit when the operating voltage is lower than the normal operating voltage range, and transmit a high voltage error message to the control unit when the operating voltage is higher than the normal operating voltage range, and
wherein the control unit is further configured to control the DC/DC converter to raise the operating voltage to within the normal operating voltage range after receiving the low voltage error message and reduce the operating voltage to within the normal operating voltage range after receiving the high voltage error message.

6. The relay switch device of claim 1, wherein the control unit is further configured to function as a battery management system (BMS) that controls overcharge or overdischarge of the battery pack.

7. The relay switch device of claim 1, wherein the relay assembly is a hinge-type electromagnetic relay assembly or a plunger-type electromagnetic relay assembly.

8. The relay switch device of claim 3, wherein the connecting contact member faces the first and second contact members and is spaced apart from the first and second contact members by a predetermined interval,
wherein the relay assembly further includes a plunger unit coupled to the connecting contact member and is configured to linearly reciprocate to cause the connecting contact member to move in contact with and out of contact from the first and second contact members,
wherein the coil unit is hollow, and
wherein the plunger unit is disposed in a central passage inside the coil unit.

9. The relay switch device of claim 8, wherein the plunger unit comprises:
a moving core configured to move in the central passage by an electromagnetic force of the coil unit;
a plunger shaft extending from the moving core and connected to the moving connecting contact member; and
a hollow fix core block through which the plunger shaft passes, wherein the hollow fix core block is fixedly installed in the central passage to restrict a movement of the moving core in the central passage.

10. The relay switch device of claim 3, wherein the operating voltage sensing unit and the DC/DC converter are integrally cased with the relay assembly.

11. The apparatus of claim 1, wherein the control unit is configured to sufficiently block the supply of the power to the coil unit so as to avoid sparking between the connecting contact member and the first and second contact members.

* * * * *